12) United States Patent (10) Patent No.: US 12,492,910 B2
Zou et al. (45) Date of Patent: Dec. 9, 2025

(54) PATH PLANNING METHOD, APPARATUS AND ELECTRONIC DEVICE

(71) Applicant: Goertek Inc., Shandong (CN)

(72) Inventors: Libing Zou, Shandong (CN); Yifan Zhang, Shandong (CN); Yue Ning, Shandong (CN); Fuqiang Zhang, Shandong (CN)

(73) Assignee: Goertek Inc., Weifang (CN)

( * ) Notice: Subject to any disclaimer, the term of this patent is extended or adjusted under 35 U.S.C. 154(b) by 221 days.

(21) Appl. No.: 18/037,914

(22) PCT Filed: Sep. 28, 2021

(86) PCT No.: PCT/CN2021/121113
§ 371 (c)(1),
(2) Date: May 19, 2023

(87) PCT Pub. No.: WO2022/105437
PCT Pub. Date: May 27, 2022

(65) Prior Publication Data
US 2023/0408278 A1 Dec. 21, 2023

(30) Foreign Application Priority Data
Nov. 19, 2020 (CN) .......................... 202011304527.5

(51) Int. Cl.
*G01C 21/34* (2006.01)
*G06N 3/084* (2023.01)

(52) U.S. Cl.
CPC ......... *G01C 21/3492* (2013.01); *G06N 3/084* (2013.01); *B60W 2554/4042* (2020.02); *B60W 2554/406* (2020.02)

(58) Field of Classification Search
CPC ............... G01C 21/3492; G06N 3/084; B60W 2554/4042; B60W 2554/406
See application file for complete search history.

(56) References Cited

U.S. PATENT DOCUMENTS

2019/0033085 A1\* 1/2019 Ogale ................ G01C 21/3446
2021/0209939 A1\* 7/2021 Wang ......................... G06T 7/90
2022/0081000 A1\* 3/2022 Jiang .................. B60W 60/0011

FOREIGN PATENT DOCUMENTS

CN 107180530 A 9/2017
CN 110375760 A 10/2019
(Continued)

OTHER PUBLICATIONS

"Unmanned Vehicle Path Planning Based on Deep Q Learning in Real Environment" by Xiao Hao, et al., Journal of Shandong University, vol. 50, No. 6, Dec. 2020.

*Primary Examiner* — Adnan M Mirza
(74) *Attorney, Agent, or Firm* — Baker Botts LLP

(57) ABSTRACT

The subject matter provides a path planning method, apparatus and electronic device. Wherein, the method comprises: performing environment modeling according to static road network information and dynamic road condition information of a road network so as to obtain an environment model; determining a plurality of candidate paths according to a starting point and an ending point; extracting from the environment model an environmental feature corresponding to each candidate path by a feature extraction network of a path planning model; inputting the environmental feature to a value estimation network of the path planning model so as to obtain an estimated value for each candidate path output by the value estimation network; determining an optimal path among the candidate paths according to the estimated value.

13 Claims, 2 Drawing Sheets

(56) References Cited

FOREIGN PATENT DOCUMENTS

| CN | 110823236 A | 2/2020 |
| CN | 111489553 A | 8/2020 |
| CN | 112529254 A | 3/2021 |

* cited by examiner

PATH PLANNING METHOD, APPARATUS AND ELECTRONIC DEVICE

CROSS-REFERENCE TO RELATED APPLICATIONS

This application is a National Stage of International Application No. PCT/CN2021/121113, filed on Sep. 28, 2021, which claims priority to Chinese Patent Application No. 202011304527.5, filed on Nov. 19, 2020, both of which are hereby incorporated by reference in their entireties.

TECHNICAL FIELD

The present disclosure relates to the field of computer technologies, in particular to a path planning method, apparatus and electronic device.

BACKGROUND

Path planning is the basis for navigation and even autonomous driving. At present, typical path planning methods are essentially categorized into static path planning and dynamic path planning. Static path planning is suitable for the environment where the agent (such as the agent) and the task are relatively unchanged, i.e., an ideal scenario. By contrast, a more common scenario in real life is dynamic path planning. Dynamic path planning includes dynamic elements, such as the dynamicity of the number of the agent, the variability of the speed of the agent, the randomness of the task, and the influence from various environmental noises. Therefore, dynamic path planning is of greater practicality and more challenging.

In the prior art, single-body dynamic planning (e.g., D*) dominates the field of dynamic path planning, however, it is poor in performance in a multi-body dynamic environment due to inconsideration on influences of other autonomous mobile agents. In addition, path planning methods such as DWA (Dynamic Window Approach) have small time windows and are limited in time.

As a result, there is a need for an improved way of path planning.

SUMMARY

Embodiments of the present disclosure disclose a path planning method, apparatus and electronic device, so as to realize spatial and temporal globalization of path planning.

The following technical solutions are adopted in embodiments of the present disclosure:

In the first aspect, a path planning method is provided by the embodiments of the present disclosure, comprising: performing environment modeling according to static road network information and dynamic road condition information of a road network so as to obtain an environment model, the dynamic road condition information comprising motion states of a plurality of agents in the road network; determining a plurality of candidate paths according to a starting point and an ending point; extracting from the environment model an environmental feature corresponding to each candidate path by a feature extraction network of a path planning model; inputting the environmental feature to a value estimation network of the path planning model so as to obtain an estimated value for each candidate path output by the value estimation network; determining an optimal path among the candidate paths according to the estimated value.

In the second aspect, a path planning apparatus is also provided by the embodiments of the present disclosure, and the apparatus comprises:

an environment modeling unit for performing environment modeling according to static road network information and dynamic road condition information of a road network so as to obtain an environment model, the dynamic road condition information comprising motion states of a plurality of agents in the road network;

a candidate paths unit for determining a plurality of candidate paths according to a starting point and an ending point;

a feature extraction unit for extracting from the environment model an environmental feature corresponding to each candidate path by a feature extraction network of a path planning model;

a value estimation unit for inputting the environmental feature to a value estimation network of the path planning model so as to obtain an estimated value for each candidate path output by the value estimation network;

a path determining unit for determining an optimal path among the candidate paths according to the estimated value.

In the third aspect, an electronic device is also provided by the embodiments of the present disclosure, comprising: a processor; and a memory configured for storing computer executable instructions which, when executed, allows the processor to execute the above path planning method.

In the fourth aspect, a computer-readable storage medium is also provided by the embodiments of the present disclosure, and stores one or a plurality of programs, which, when executed by the electronic device comprising a plurality of applications, allows the electronic device to execute the above path planning method.

At least one of the above technical solutions adopted in the embodiments of the present disclosure can achieve the following beneficial effects: both static and dynamic information are considered when modeling environment, which makes the path planning more practical, and the dynamic road condition information comprises the motion states of the plurality of agents in the road network, which has a spatial globalization; when performing the path planning, the environmental feature corresponding to the candidate paths determined according to the starting and ending points are extracted according to the environment model, thus achieving a full-path planning instead of a time-windowed planning, which may balance benefits of a current decision and total benefits of the future, and has a temporal globalization.

BRIEF DESCRIPTION OF THE DRAWINGS

The accompanying drawings described herein are intended to provide a further understanding of the present disclosure and constitute a part of the description, and illustrative embodiments of the present disclosure and the description thereof serve to explain the present disclosure and do not constitute an undue limitation of the disclosure.

DETAILED DESCRIPTION

In order to make the purpose, technical solutions and advantages of the present disclosure clearer, the following will be a clear and complete description of the technical solutions of the present disclosure in conjunction with specific embodiments of the present disclosure and the corresponding accompanying drawings. Obviously, the described embodiments are only a part of the embodiments of the present disclosure, and not all of them. Based on the embodiments in the present disclosure, all other embodiments obtained by a person of ordinary skill in the art without making creative labor fall within the scope of protection of the present disclosure.

The technical concept of the present disclosure is to consider not only the state of the agent itself but also the states of other agents when planning the path, and to plan the path as a whole, thus taking into account the global aspects of both space and time.

The technical solutions provided by the embodiments of the present application are described in detail below with reference to the accompanying drawings.

Figure 1:
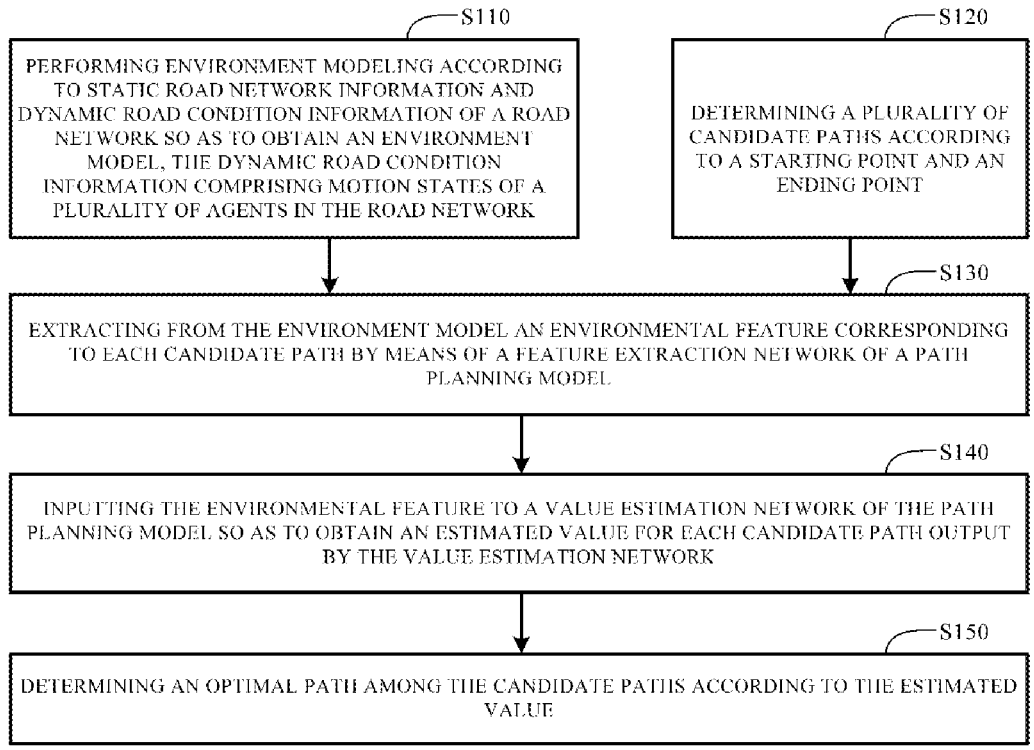
FIG. 1 illustrates a schematic flow diagram of a path planning method according to an embodiment of the present disclosure.

FIG. 1 illustrates a schematic flow diagram of a path planning method according to an embodiment of the present disclosure. As shown in FIG. 1, the method comprises:

Step S110, performing environment modeling according to static road network information and dynamic road condition information of a road network so as to obtain an environment model, the dynamic road condition information comprising motion states of a plurality of agents in the road network.

The road network is the abbreviation of a road traffic network. The static road network information can describe the static invariable information such as the direction, the connection relationship, and the length of the road. In practical scenarios, however, there are usually other agents driving on the road. In order to improve the practical value of the technical solution, the present disclosure also uses the dynamic road condition information when modeling the environment, thereby taking into account the motion states of a plurality of agents in the road network.

In the present disclosure, the agent refers to an object that can move autonomously in a road network, such as various types of vehicles.

Step S120, determining a plurality of candidate paths according to a starting point and an ending point.

The process of determining the candidate paths may be implemented using existing techniques, for example, by choosing any of path finding algorithms. Based on a pair of starting and ending points, a plurality of candidate paths can usually be found, and the objective of the present disclosure is to select an optimal path from the plurality of candidate paths.

It should be noted that the steps S120 and S110 are not executed in a strict sequential order and may also be executed in parallel.

Step S130, extracting from the environment model an environmental feature corresponding to each candidate path by a feature extraction network of a path planning model.

Step S140, inputting the environmental feature to a value estimation network of the path planning model so as to obtain an estimated value for each candidate path output by the value estimation network.

In the present disclosure, the path planning model comprises two sub-networks, i.e., a feature extraction network for performing environmental post extraction and a value estimation network for performing path comparison. The estimated value can be realized by selecting different dimensions according to actual needs, for example, if a time dimension is selected, the estimated value is predicted passing time length; in addition, a safety dimension, a comfort dimension, etc. may be selected, which are not listed here.

Step S150, determining an optimal path among the candidate paths according to the estimated value.

This step may be implemented using existing techniques, such as the E-greedy algorithm.

As can be seen, the method shown in FIG. 1 considers both static and dynamic information when modeling environment, which makes the path planning more practical, and the dynamic road condition information comprises the motion states of the plurality of agents in the road network, which has a spatial globalization; when performing the path planning, the environmental feature corresponding to the candidate paths determined according to the starting and ending points are extracted according to the environment model, thus achieving a full-path planning instead of a time-windowed planning, which may balance benefits of a current decision and total benefits of the future, and has a temporal globalization.

In some embodiments, said "extracting from the environment model an environmental feature corresponding to each candidate path by a feature extraction network of a path planning model" includes: for a road segment contained in the candidate paths, extracting from the environment model a static environmental feature and a dynamic environmental feature of the road segment, and then splicing them together to obtain a road segment environmental feature; determining an environmental feature of the candidate paths according to the road segment environmental feature of each road segment in the candidate paths by a long short-term memory neural network LSTM.

A candidate path from the starting point to the ending point is usually composed of a plurality of road segments, each of which is a segment of road. In order to obtain the environmental feature of the candidate path, the environmental feature of each road segment may be determined first. Since performing environment modeling comprises both dynamic and static aspects, the static environmental feature and dynamic environmental feature of the road segment may be extracted separately, and then are spliced together to obtain the environmental feature of the road segment, and the splicing operation may be realized specifically by the concat( ) function.

After the environmental feature of each road segment is obtained, there will be a problem: for a plurality of candidate paths, the number and composition of the road segments contained in individual candidate paths are not exactly the same (otherwise they constitute the same path), and if a simple splicing operation is performed, the length of the environmental features of the individual candidate paths will be inconsistent, which is not convenient for subsequent value estimation. Therefore, in the present disclosure, based on the obtained environmental feature of the road segment, LSTM is used to obtain the environmental feature of the candidate path, thereby ensuring that the format of the environmental features of the candidate path is uniform, and thus realizing candidate path embedding (Path-Embedding).

In some embodiments, the static road network information comprises a vector representation of the road segment, and said "performing environment modeling according to static road network information and dynamic road condition information of a road network so as to obtain an environment model" includes: building the static road network information into a road-network-oriented graph G=(V, E, W), wherein elements in V characterize individual road segments in the road network, elements in E characterize relationships between the individual road segments, and elements in W characterize lengths of the individual road segment; said "extracting from the environment model a static environmental feature and a dynamic environmental feature of the road segment" includes: by a graph neural network Graph-Bert, extracting a feature vector from the oriented graph as the static environmental feature of the road segment.

In some technical solutions, path planning uses a raster road network map obtained after rasterizing the path. The raster road network map is reduced in accuracy due to the fact that a continuous road network is discretized into individual road network grids, which is a compromise that facilitates neural network learning. In the embodiment of the present disclosure, by the vector representation of the road segments, the road-network-oriented graph is built directly instead of the raster road network map.

In the oriented graph, Vis a vertex set, while in the embodiments of the present disclosure V is used as a road segment set, with the elements therein characterizing the individual road segments in the road network. E is a relationship set between a road segment and another road segment. In some embodiments, $e_{ij}\{e_{ij} \in E\}$ takes the following value ($e_{ij}$ characterizes a relationship between a road segment $l_i$ and a segment $l_j$): if the road segment $l_i$ and the segment $l_j$ are not adjacent to each other, then $e_{ij}=0$; if the road segment $l_i$ and the segment $l_j$ are adjacent to each other, and the road segment $l_i$ is into the segment $l_j$ then $e_{ij}=1$; if the road segment $l_i$ and the segment $l_j$ are adjacent to each other, and the road segment $l_j$ is into the segment $l_i$, then $e_{ij}=2$; $e_{ii}=3$. It should be noted that the specific value of $e_{ij}$ may not be limited to the example given above.

W is a length set of the road segments, and $w_{ij}\{w_{ij} \in W\}$ characterizes a length of a certain road segment $l_i$.

After the oriented graph G is built, connection relationships between the nodes of the oriented graph are extracted by Graph-Bert network, and a feature vector of the specified road section l in the road segment set V is output by a query operation.

Graph-Bert network is a graph neural network that incorporates Bert (Bidirectional Encoder Representations from Transformers) and enables the migration (transfer) of oriented graph through the Attention mechanism. Through Graph-Bert, the correlation of nodes of oriented graph G can be extracted for node feature expression or oriented graph reconstruction.

In some embodiments, said "performing environment modeling according to static road network information and dynamic road condition information of a road network so as to obtain an environment model" includes: determining dynamic environmental attributes of the individual road segments according to the dynamic road condition information, the dynamic environmental attributes comprising a quantity dimension of agents and/or a speed dimension of agents; said "extracting from the environment model an environmental feature corresponding to each candidate path by a feature extraction network of a path planning model" includes: splicing values of individual dimensions of the dynamic environmental attributes into a feature vector as the dynamic environment feature, or, extracting a feature vector as the dynamic environment feature from the dynamic environmental attributes by a neural network.

In some embodiments, considering that the influencing factors of dynamic road condition information on path planning mainly lie in the number and speed of agents in the road network, values of individual dimensions of the dynamic environmental attributes may be spliced into a feature vector as the dynamic environment feature, which is simple to operate. Of course, it is also possible to extract a feature vector as the dynamic environment feature from the dynamic environmental attributes by a neural network if it is necessary to improve the accuracy, but it will increase the time required for path planning accordingly.

Specifically, the average speed of the agent may be calculated as the value of the speed dimension, which means that when performing path planning, itself can complete that road segment of the candidate path with the average speed of the agent. However, there will be a problem in special cases, i.e., when there is no agent in a certain road segment, if the average speed of the agent (0 at this time) is still taken as the value of the speed dimension, it will cause itself to be impassable in that road segment. In fact, if there are no other agents on that road segment, it means that the section is in an ideal situation and can be passed at the maximum speed limit of that road segment. That is, in some embodiments, if a value of the quantity dimension of the agents is not 0, a value of the speed dimension is an average speed of the agents; if the value of the quantity dimension of the agents is 0, the value of the speed dimension is a preset maximum speed.

For example, the dynamic environmental feature of the road section 1 is represented as a vector (avgSpeed, carNums), wherein, avgSpeed is the total number of vehicles of the road section 1, and if avgSpeed is 0, then $$avgSpeed = \frac{1}{n}\sum\nolimits_{i=0}^{n} CarSpeed_i;$$

$CarSpeed_i$ is the speed of the ith vehicle, n=carNums, if carNums=0, then avgSpeed=maxSpeed, maxSpeed is the preset maximum speed, characterizing the maximum speed limit of the road segment 1.

It can be seen that the value of the speed dimension characterizes the speed that can be used when actually traveling on the road segment.

In some embodiments, the estimated value is a predicted passing time length, and the method further include: using the individual road segments as training samples, using predicted passing time lengths of the candidate paths as sample prediction values, and obtaining simulated passing time lengths and/or actual passing time lengths of the candidate paths as sample true values; determining a training loss value according to the sample prediction values and the sample true values; updating parameters of the feature extraction network and a time prediction network according to the training loss value and a back propagation algorithm.

Since the actual passing time lengths are not available in the offline scenario, a simulator may be used to simulate the vehicle driving on the planned path to obtain the simulated passing time lengths.

In some embodiments, said "determining a training loss value according to the sample prediction values and the sample true values" includes: calculating the training loss value by a mean squared error function $$L = \frac{1}{m}\sum\nolimits^{m}(y-\tilde{y})^2,$$

wherein y is a sample true value, ỹ is a sample prediction value, and m is the number of samples. The mean squared error function may calculate the Euclidean distance between the sample prediction value and the sample true value. The closer the sample prediction value and the sample true value are, the smaller the mean squared error function between them is, and the better the path planning model will be.

In some embodiments, said "using the individual road segments as training samples" includes: inputting the training samples into a sample experience pool; in an event that the number of the training samples in the sample experience pool reaches a predetermined value, performing a step of updating parameters of the feature extraction network and a time prediction network according to the training loss value and a back propagation algorithm, and initializing the sample experience pool after the parameters are updated. This enables online learning of path planning models, and enables timely updating of path planning models to improve results.

The following is described in a specific embodiment.

Step S210, initializing the experience pool D and setting the size of its capacity to N.

Step S220, initializing the feature extraction network F-Network of the path planning model and randomly assigning its parameters.

Step S230, initializing the value estimation network Q-Network of the path planning model and randomly assigning its parameters.

Step S240, generating the oriented graph G according to the static road network information, and initializing the Graph-Bert.

Step S250, training the path planning model by a plurality of training phases. Specifically, the following substeps S251~S253 are performed in each training phase:

Step S251, simulatedly generating a plurality of path planning tasks T(start, end) comprising the starting point start and ending point end, wherein the number of the path planning tasks is M.

Step S252, initializing the dynamic array B of the road network, wherein the length of the array is the same as the size of V in the oriented graph G, that is, Size(D)=Size(V). The initialization value B of the array is 0.

Step S253, generating M agents in parallel. Each agent further performs the following substeps S2531~S2536:

Step S2531, finding the candidate paths $\{p_0, p_1, p_2, \ldots, p_n\}$ for each task through a pathfinding algorithm.

Figure 2:
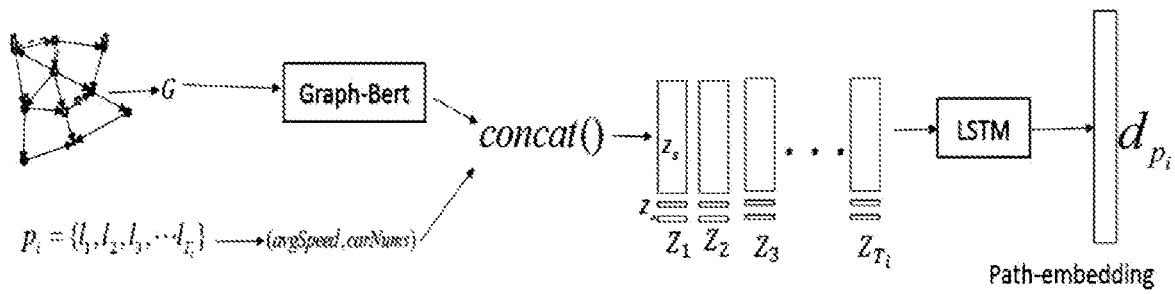
FIG. 2 illustrates a schematic flow diagram of environmental feature extraction for a candidate path according to an embodiment of the present disclosure.

Step S2532, for the candidate path $p_i$, see the way shown in FIG. 2, extracting the environmental feature of the candidate path by F-Network, which specifically comprises substeps S25321~S25324:

Step S25321, by a graph neural network Graph-Bert, extracting a feature vector $z_s$ from the oriented graph as the static environmental feature of the road segment.

Step S25322, determining the dynamic environmental feature $z_a$ of the road segment $l_{Ti}$ as (avgSpeed, carNums), which may be determined specifically with reference to the above embodiments.

Step S25323, splicing $z_s$ and $z_a$ into the environmental feature of the road segment $l_{Ti}$ by the concat( ) function. Specifically, the spliced feature may be further processed by two FC (Fully Connected) layers to obtain the environmental feature $z_{Ti}$=FC(concat($z_s$, $z_a$)) of the road segment $l_{Ti}$.

Step S25324, inputting $z_{Ti}$ into LSTM to obtain the environmental feature $d_{pi}$ of the candidate path $p_i$.

Step S2533, inputting $d_{pi}$ into Q-Network to obtain a predicted passing time length $\tilde{y}_{p_i}$.

Step S2534, selecting the optimal path $p_k$ according to $\tilde{y}_{p_i}$ by the E-greedy algorithm Step S2535, operating the agent simulatedly and updating the dynamic array B of the network.

Step S2536, recording the simulated passing time length $y_k$ to obtain a training sample ($p_k$, $y_k$, $\tilde{y}_{p_i}$), and adding it to the sample experience pool D.

Step S254, calculating the mean square error loss of new samples if the number of these new samples in the sample experience pool is >0.7*N and updating parameters of F-Network and Q-Network according to the calculated mean square error loss by the back-propagation algorithm.

Step S255, resetting the dynamic array B of the road network.

In the process of online learning, all that needs to be done is to replace the agent in step S253 and its sub-steps with the actual vehicle, that is, there is no need to operate the agent simulatedly, but the actual passing time lengths can be obtained according to the actual operation of the vehicle.

A path planning apparatus is also provided by embodiments of the present disclosure, which may be used to implement the path planning method as shown in any of the above embodiments.

Figure 3:
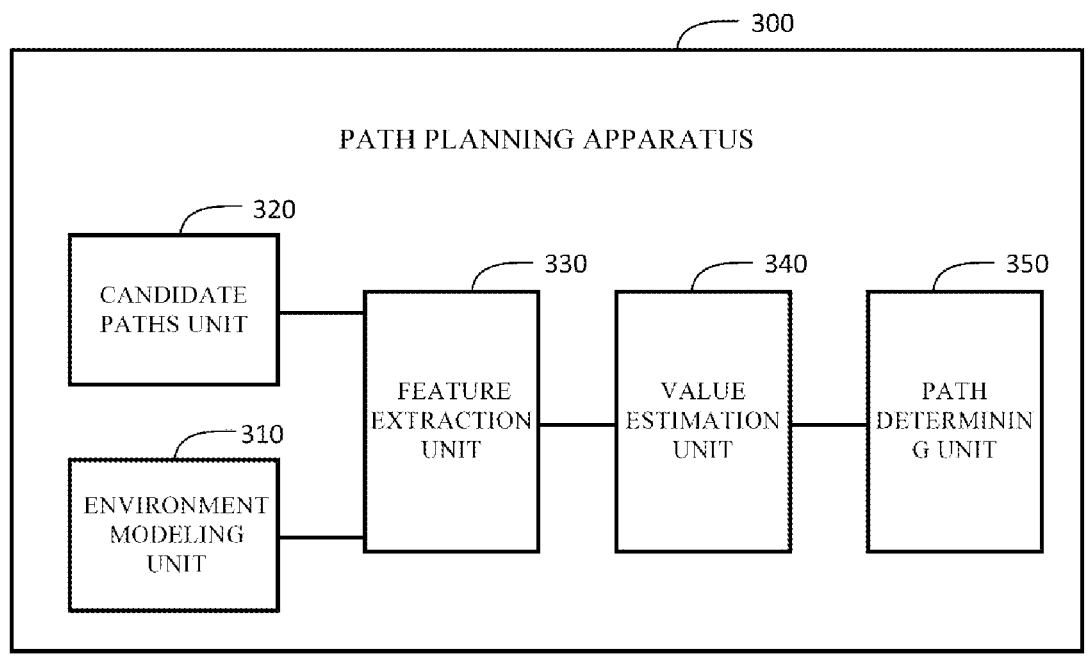
FIG. 3 illustrates a schematic flow diagram of a path planning method according to an embodiment of the present disclosure.

Specifically, FIG. 3 shows a schematic view of a path planning apparatus according to one embodiment of the present application. As shown in FIG. 3, the path planning apparatus 300 comprises:

an environment modeling unit 310 for performing environment modeling according to static road network information and dynamic road condition information of a road network so as to obtain an environment model, the dynamic road condition information comprising motion states of a plurality of agents in the road network;

a candidate paths unit 320 for determining a plurality of candidate paths according to a starting point and an ending point;

a feature extraction unit 330 for extracting from the environment model an environmental feature corresponding to each candidate path by a feature extraction network of a path planning model;

a value estimation unit 340 for inputting the environmental feature to a value estimation network of the path planning model so as to obtain an estimated value for each candidate path output by the value estimation network;

a path determining unit 350 for determining an optimal path among the candidate paths according to the estimated value.

In some embodiments, the feature extraction unit 330 is used for extracting from the environment model a static environmental feature and a dynamic environmental feature of a road segment contained in the candidate paths for the road segment, and then splicing them together to obtain a road segment environmental feature; determining an environmental feature of the candidate paths according to the road segment environmental feature of each road segment in the candidate paths by a long short-term memory neural network LSTM.

In some embodiments, the static road network information comprises a vector representation of the road segment, and the environment modeling unit 310 is used for building the static road network information into a road-network-oriented graph G=(V, E, W), wherein elements in V characterize individual road segments in the road network, elements in E characterize relationships between the individual road segments, and elements in W characterize lengths of the individual road segments; the feature extraction unit 330 is used for extracting a feature vector from the oriented graph as the static environmental feature of the road segment by a graph neural network Graph-Bert.

In some embodiments, the environment modeling unit 310 is used for determining dynamic environmental attributes of the individual road segments according to the dynamic road condition information, the dynamic environmental attributes comprising a quantity dimension of agents and/or a speed dimension of agents; the feature extraction unit 330 is used for splicing values of individual dimensions of the dynamic environmental attributes into a feature vector as the dynamic environment feature, or, extracting a feature vector as the dynamic environment feature from the dynamic environmental attributes by a neural network.

In some embodiments, if a value of the quantity dimension of the agents is not 0, a value of the speed dimension is an average speed of the agents; if the value of the quantity dimension of the agents is 0, the value of the speed dimension is a preset maximum speed.

In some embodiments, the estimated value is a predicted passing time length, and the apparatus further comprises a training unit for using the individual road segments as training samples, using predicted passing time lengths of the candidate paths as sample prediction values, and obtaining simulated passing time lengths and/or actual passing time lengths of the candidate paths as sample true values; determining a training loss value according to the sample prediction values and the sample true values; updating parameters of the feature extraction network and a time prediction network according to the training loss value and a back propagation algorithm.

In some embodiments, the training unit is used for calculating the training loss value by a mean squared error function $$L = \frac{1}{m}\sum^{m}(y - \tilde{y})^3,$$

wherein y is the true value, ỹ is the sample prediction value, and m is the number of the samples.

In some embodiments, the training unit is used for inputting the training samples into a sample experience pool; in an event that the number of the training samples in the sample experience pool reaches a predetermined value, performing a step of updating parameters of the feature extraction network and a time prediction network according to the training loss value and a back propagation algorithm, and initializing the sample experience pool after the parameters are updated.

It is understood that the above path planning apparatus is capable of implementing the steps of the path planning method provided in the aforementioned embodiment, and the relevant explanations about the path planning method are applicable to the path planning apparatus and will not be repeated herein.

Figure 4:
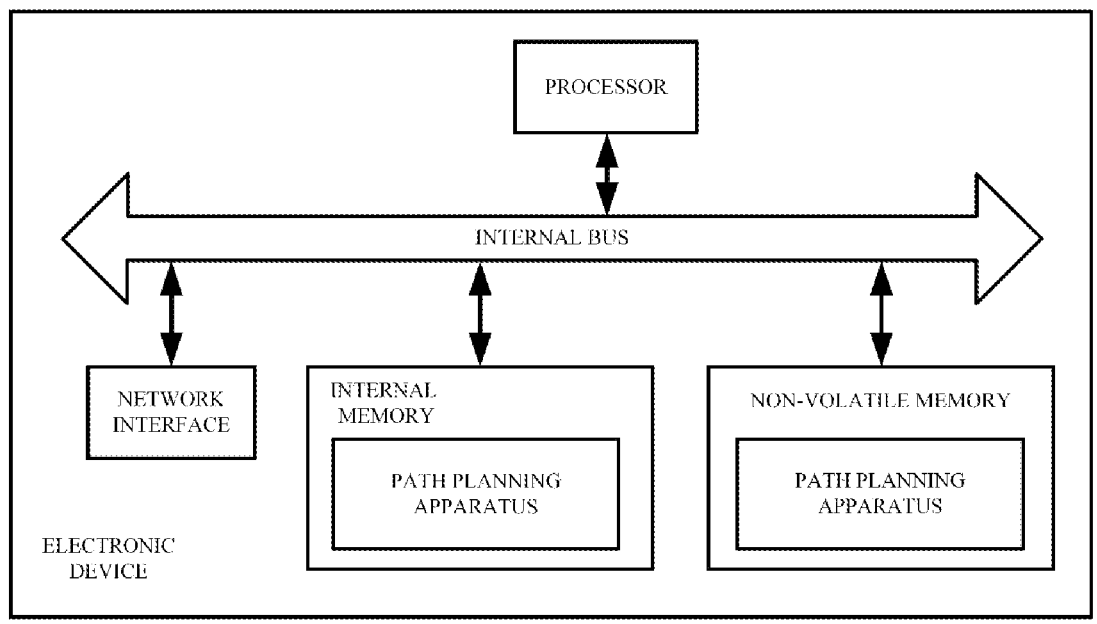
FIG. 4 illustrates a schematic structure diagram of an electronic device in an embodiment of the present disclosure.

FIG. 4 is a schematic diagram of the structure of an electronic device in one embodiment of the present disclosure. Referring to FIG. 4, at the hardware level, the electronic device comprises a processor, and optionally comprises an internal bus, a network interface, and a memory. Wherein, the memory may comprise an internal memory, such as high-speed random-access memory (RAM), and may also comprise a non-volatile memory, such as at least one disk memory. Of course, the electronic device may also comprise a hardware needed by other businesses.

The processors, network interface and memory can be connected to each other through the internal bus, which may be an ISA (Industry Standard Architecture) bus, a PCI (Peripheral Component Interconnect) bus or an EISA (Extended Industry Standard Architecture) bus, etc. The bus may be address buses, data buses, control buses, etc. For illustration purposes, the bus is represented by only a bidirectional arrow in FIG. 4, which does not indicate that there is only one bus or one type of bus.

The memory is used to store programs. Specifically, the program may comprise a program code, and the program code comprises computer operation instructions. The memory may comprise the internal memory and non-volatile memory, and provide instructions and data to the processor.

The processor reads the corresponding computer program from non-volatile memory into the internal memory and runs it, and forms a path planning apparatus at the logical level. The processor executes the program stored in memory and is specifically used to do the following:

performing environment modeling according to static road network information and dynamic road condition information of a road network so as to obtain an environment model, the dynamic road condition information comprising motion states of a plurality of agents in the road network; determining a plurality of candidate paths according to a starting point and an ending point; extracting from the environment model an environmental feature corresponding to each candidate path by a feature extraction network of a path planning model; inputting the environmental feature to a value estimation network of the path planning model so as to obtain an estimated value for each candidate path output by the value estimation network; determining an optimal path among the candidate paths according to the estimated value.

The method performed by the path planning apparatus as disclosed above in the embodiment shown in FIG. 1 of the present disclosure may be applied in, or implemented by, the processor. The processor may be an integrated circuit chip with the ability to process signals. In implementation, the steps of the above method may be accomplished by integrated logic circuitry in the hardware in the processor or by instructions in the form of software. The above processor may be a general-purpose processor, comprising a central processing unit (CPU), a network processor (NP), etc.; it may also be a digital signal processor (DSP), an application specific integrated circuit (ASIC), a field-programmable gate array (FPGA), or other programmable logic device, discrete gate or transistor logic device, discrete hardware component. The respective methods, steps, and logic block diagrams of the disclosure in embodiments of the present disclosure may be implemented or performed. The general purpose processor may be a microprocessor or the processor may also be any conventional processor, etc. The steps of the method disclosed in conjunction with the embodiments of the present disclosure may be embodied directly in the hardware decoding processor for execution, or in a combination of hardware and software modules in the decoding processor for execution. The software module can be located in random memory, flash memory, read-only memory, programmable read-only memory or electrically rewritable programmable memory, registers, and other storage media well established in the art. The storage medium is located in the memory and the processor reads the information in the memory and completes the steps of the above method in combination with its hardware.

The electronic device may also execute the method executed by the path planning apparatus in FIG. 1, and implement the function of the path planning apparatus in the embodiment shown in FIG. 1. Other specific functions performed by the electronic device in the present embodiment may be referred to the relevant content of the above method embodiment, which will not be repeated herein.

Embodiments of the present disclosure also propose a computer-readable storage medium that stores one or a plurality of programs, the one or a plurality of programs comprising instructions that, when executed by an electronic device comprising a plurality of applications, enables the electronic device to execute the method executed by the path planning apparatus in the embodiment shown in FIG. 1, and is specifically used to execute:

performing environment modeling according to static road network information and dynamic road condition information of a road network so as to obtain an environment model, the dynamic road condition information comprising motion states of a plurality of agents in the road network; determining a plurality of candidate paths according to a starting point and an ending point; extracting from the environment model an environmental feature corresponding to each candidate path by a feature extraction network of a path planning model; inputting the environmental feature to a value estimation network of the path planning model so as to obtain an estimated value for each candidate path output by the value estimation network; determining an optimal path among the candidate paths according to the estimated value.

Other specific functions performed by the program stored on a computer-readable storage medium in the present embodiment may be referred to the relevant content of the above method embodiment, which will not be repeated herein.

The present disclosure is described with reference to a flowchart and/or block diagram of a method, apparatus (system), and computer program product according to embodiments of the present disclosure. It should be understood that each process and/or block in the flowchart and/or block diagram, and the combination of the process and/or blocks in the flowchart and/or block diagram can be implemented by computer program instructions. These computer program instructions may be provided to the processor of a general-purpose computer, a special purpose computer, an embedded processor or other programmable data processing device to generate a machine, such that the instructions executed by the processor of a computer or other programmable data processing device produce devices for carrying out the functions specified in a process or a plurality of processes of the flowchart and/or a block or a plurality of blocks of a block diagram.

These computer program instructions may also be loaded onto a computer or other programmable data processing device such that a series of operational steps are performed on the computer or other programmable device to produce computer-implemented processing, such that the instructions executed on the computer or other programmable device provide the steps for carrying out the functions specified in a process or a plurality of processes of the flowchart and/or a block or a plurality of blocks of a block diagram.

In a typical configuration, the computing device comprises one or a plurality of processors (CPU), input/output interfaces, network interfaces, and internal memory.

Computer-readable media comprise permanent and non-permanent, removable and non-removable media, and can be implemented by any method or technology to store information. The information may be computer readable instructions, data structures, modules of a program, or other data. Examples of storage media for computers comprise, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc only Read Memory (CD-ROM), Digital Versatile Disc (DVD) or other optical storage, magnetic cartridge tape, magnetic tape disk storage or other magnetic storage device, or any other non-transport medium, and may be used to store information that can be accessed by a computing device. As defined herein, computer readable media does not comprise transient computer readable media (transitory media), such as modulated data signals and carriers.

The foregoing is merely an example of an embodiment of the present disclosure and is not intended to limit the present disclosure. To a person skilled in the art, the present disclosure may be subject to various changes and variations. Any modification, equivalent replacement, improvement, etc. made within the spirit and principles of this disclosure shall be comprised within the scope of the claims of this disclosure.

The invention claimed is:

1. A path planning method, wherein the method comprises:
building static road network information into a road-network-oriented graph G=(V, E, W), wherein elements in V characterize individual road segments in a road network, elements in E characterize relationships between the individual road segments, and elements in W characterize lengths of the individual road segments, wherein the static road network information comprises a vector representation of a road segment,
performing environment modeling according to the static road network information and dynamic road condition information of a road network so as to obtain an environment model, the dynamic road condition information comprising motion states of a plurality of agents in the road network, determining dynamic environmental attributes of the individual road segments according to the dynamic road condition information, the dynamic environment attributes comprising a speed dimension of agents-having a value thereof characterizing speed used when actually traveling on the road segment;
determining a plurality of candidate paths according to a starting point and an ending point;
extracting from the environment model an environmental feature corresponding to each candidate path by a feature extraction network of a path planning model;

inputting the environmental feature to a value estimation network of the path planning model so as to obtain an estimated value for each candidate path output by the value estimation network;

determining an optimal path among the candidate paths according to the estimated value.

2. The method of claim 1, wherein, said "extracting from the environment model an environmental feature corresponding to each candidate path by a feature extraction network of a path planning model" comprises:

for a road segment contained in the candidate paths, extracting from the environment model a static environmental feature and a dynamic environmental feature of the road segment, and then splicing them together to obtain a road segment environmental feature;

determining an environmental feature of the candidate paths according to the road segment environmental feature of each road segment in the candidate paths by a long short-term memory neural network LSTM.

3. The method of claim 2, wherein, said "extracting from the environment model a static environmental feature and a dynamic environmental feature of the road segment" comprises:

by a graph neural network Graph-Bert, extracting a feature vector from the oriented graph as the static environmental feature of the road segment.

4. The method of claim 2, wherein, the dynamic environmental attributes further comprising a quantity dimension of agents;

said "extracting from the environment model an environmental feature corresponding to each candidate path by a feature extraction network of a path planning model" comprises:

splicing values of individual dimensions of the dynamic environmental attributes into a feature vector as the dynamic environment feature, or, extracting a feature vector as the dynamic environment feature from the dynamic environmental attributes by a neural network.

5. The method of claim 4, wherein, if a value of the quantity dimension of the agents is not 0, a value of the speed dimension is an average speed of the agents;

if the value of the quantity dimension of the agents is 0, the value of the speed dimension is a preset maximum speed.

6. The method of claim 1, wherein, the estimated value is a predicted passing time length, and the method further comprises:

using the individual road segments as training samples, using predicted passing time lengths of the candidate paths as sample prediction values, and obtaining a simulated passing time length and/or an actual passing time length of the candidate paths as sample true values;

determining a training loss value according to the sample prediction values and the sample true values;

updating parameters of the feature extraction network and a time prediction network according to the training loss value and a back propagation algorithm.

7. The method of claim 6, wherein, said "determining a training loss value according to the sample prediction values and the sample true values" comprises:

calculating the training loss value by a mean squared error function $$L = \frac{1}{m}\sum^{m}(y-\tilde{y})^2,$$

wherein y is the sample true value, $\tilde{y}$ is the sample prediction value, and m is the number of samples.

8. The method of claim 6, wherein, said "using the individual road segments as training samples" comprises:

inputting the training samples into a sample experience pool;

in an event that the number of the training samples in the sample experience pool reaches a predetermined value, performing a step of updating parameters of the feature extraction network and a time prediction network according to the training loss value and a back propagation algorithm, and initializing the sample experience pool after the parameters are updated.

9. A path planning apparatus, wherein the apparatus comprises:

an environment modeling unit for building static road network information into a road-network-oriented graph G=(V, E, W), wherein elements in I characterize individual road segments in the road network, elements in E characterize relationships between the individual road segments, and elements in W characterize lengths of the individual road segments, wherein the static road network information comprises a vector representation of a road segment, performing environment modeling according to the static road network information and dynamic road condition information of a road network so as to obtain an environment model, the dynamic road condition information comprising motion states of a plurality of agents in the road network determining dynamic environmental attributes of the individual road segments according to the dynamic road condition information, the dynamic environmental attributes comprising a speed dimension of agents having a value thereof characterizing speed used when actually traveling on the road segment;

a candidate paths unit for determining a plurality of candidate paths according to a starting point and an ending point;

a feature extraction unit for extracting from the environment model an environmental feature corresponding to each candidate path by a feature extraction network of a path planning model;

a value estimation unit for inputting the environmental feature to a value estimation network of the path planning model so as to obtain an estimated value for each candidate path output by the value estimation network;

a path determining unit for determining an optimal path among the candidate paths according to the estimated value.

10. The path planning apparatus of claim 9, wherein, a feature extracting unit for extracting from the environment model a static environmental feature and a dynamic environmental feature of a road segment contained in the candidate paths for the road segment, and then splicing them together to obtain a road segment environmental feature; determining an environmental feature of the candidate paths according to the road segment environmental feature of each road segment in the candidate paths by a long short-term memory neural network LSTM.

11. The path planning apparatus of claim 9, wherein, further comprising a training unit for using the individual road segments as training samples, using predicted passing time lengths of the candidate paths as sample prediction values, and obtaining a simulated passing time length and/or an actual passing time length of the candidate paths as sample true values; determining a training loss value according to the sample prediction values and the sample true values; updating parameters of the feature extraction network and a time prediction network according to the training loss value and a back propagation algorithm.

12. An electronic device, comprising:
a processor;
a memory configured for storing computer executable instructions which, when executed, allows the processor to execute following operations:
building static road network information into a road-network-oriented graph G=(V, E, W), wherein elements in I characterize individual road segments in the road network, elements in E characterize relationships between the individual road segments, and elements in W characterize lengths of the individual road segments, wherein the static road network information comprises a vector representation of a road segment, performing environment modeling according to the static road network information and dynamic road condition information of a road network so as to obtain an environment model, the dynamic road condition information including motion states of a plurality of agents in the road network, determining dynamic environmental attributes of the individual road segments according to the dynamic road condition information, the dynamic environmental attributes comprising a speed dimension of agents having a value thereof characterizing speed used when actually traveling on the road segment; determining a plurality of candidate paths according to a starting point and an ending point; extracting from the environment model an environmental feature corresponding to each candidate path by a feature extraction network of a path planning model; inputting the environmental feature to a value estimation network of the path planning model so as to obtain an estimated value for each candidate path output by the value estimation network; determining an optimal path among the candidate paths according to the estimated value.

13. The method of claim 1, wherein
$e_{ij}$ characterizes a relationship between a first road segment $l_j$ and a second road segment $l_j$, $e_{ij}\{e_{ij}\in E\}$ takes a following value: if the first road segment $l_j$ and the second road segment $l_j$ are not adjacent to each other, then en=0; if the first road segment $l_i$ and the second road segment $l_j$ are adjacent to each other, and the first road segment $l_i$ is into the segment $l_j$, then $e_{ij}$=1: if the first road segment $l_i$ and the second road segment $l_j$ are adjacent to each other, and the second road segment $l_j$ is into the first road segment $l_j$, then $e_{ij}$=2; $e_{ij}$=3.

* * * * *